(12) United States Patent
Schmitt

(10) Patent No.: US 6,466,856 B2
(45) Date of Patent: Oct. 15, 2002

(54) METHOD AND ARRANGEMENT FOR CONTROLLING THE DRIVE UNIT OF A VEHICLE

(75) Inventor: Johannes Schmitt, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/826,958

(22) Filed: Apr. 6, 2001

(65) Prior Publication Data

US 2001/0029422 A1 Oct. 11, 2001

(30) Foreign Application Priority Data

Apr. 6, 2000 (DE) .......................................... 100 17 245

(51) Int. Cl.$^7$ ............................................... G06F 17/00
(52) U.S. Cl. ......................................................... 701/82
(58) Field of Search ............................... 701/82, 87, 90

(56) References Cited

U.S. PATENT DOCUMENTS 6,151,546 A 11/2000 Schmitt et al. ............... 701/84
6,301,534 B1 * 10/2001 McDermott, Jr. et al. .... 701/41

* cited by examiner

Primary Examiner—Yonel Beaulieu
(74) Attorney, Agent, or Firm—Walter Ottesen

(57) ABSTRACT

A method and an arrangement for controlling the motor for propelling a vehicle provides for controlling a control quantity of the motor in dependence upon a driver command value. A limiting of the increase of the control quantity is undertaken when the driver command value exceeds a pregiven threshold value.

12 Claims, 5 Drawing Sheets

METHOD AND ARRANGEMENT FOR CONTROLLING THE DRIVE UNIT OF A VEHICLE

BACKGROUND OF THE INVENTION

German patent publication 197 34 112 discloses a method and an arrangement for controlling the drive unit of a vehicle. In this known solution, a drive torque is continuously computed in accordance with resistance torques which drive torque is maximally transmittable to the roadway under the given conditions. If a tendency to rotate without adherence to the roadway occurs on at least one drive wheel of the vehicle, the drive unit of the vehicle is so influenced (especially a control quantity such as the torque of the drive unit is reduced) that the maximally transmittable torque is adjusted. Thereafter, the drive unit is controlled in the context of a drive slip control and, in this way, the tendency of the at least one drive wheel to slip is reduced.

In many cases, this procedure has lead to a satisfactory solution. However, it has been shown, especially in very powerful engines, that this procedure is not optimal. Because of the power capability of the drive unit, a drive slip control intervention is introduced very rapidly when a driver command is present for high power. Because of the slippage of the drive wheels and the early drive slip control intervention, an unsatisfactory driving performance results because of the effect on the acceleration of the vehicle.

SUMMARY OF THE INVENTION

The limiting of the increase of at least one control quantity of the drive unit (when the driver outputs a control value for which an instability of the drive wheels is to be expected) leads to a finer metering of the control of the drive unit as well as to a control of the drive unit which is satisfactory with respect to actual requirements. This control quantity is preferably a control quantity, such as torque of the drive unit. The occurring drive wheel slip is reduced and even avoided in ideal cases and is shorter in time when it occurs. In this way, the acceleration capability of the vehicle is improved while simultaneously increasing the stability because the occurrence of the drive wheel slip is reduced.

It is especially advantageous that the increase limiting only takes place when the operator input is greater than a threshold value derived from the maximally transmittable value. In the stable range, the full performance is available to the operator, whereas a limiting of the increase takes place only with inputs above the maximally transmittable value. This increase limiting is optimized with respect to acceleration and stability.

A limiting of the increase takes place above the threshold value. In the determination of this threshold value, it is also advantageous to consider a stored value which corresponds to the input for the control of the drive unit for which a previous tendency toward slippage of the drive wheels and therefore the previous slip control intervention has occurred. In this way, a further improvement of the driving performance is achieved.

BRIEF DESCRIPTION OF THE DRAWINGS

The invention will now be explained with reference to the drawings wherein.

DESCRIPTION OF THE PREFERRED EMBODIMENTS OF THE INVENTION

Figure 1:
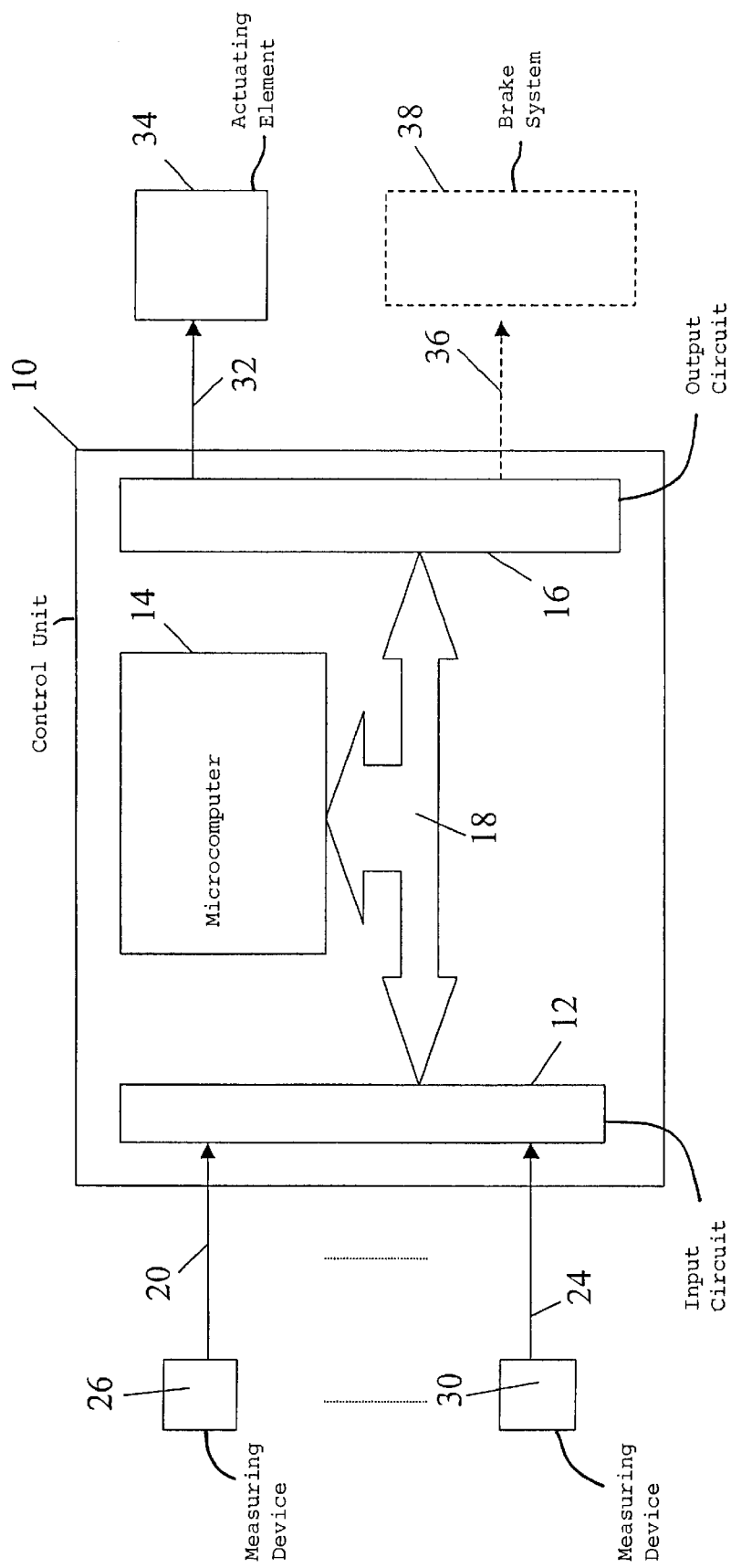
FIG. 1 shows an overview block circuit diagram of a control arrangement which influences the torque of a drive unit of a vehicle.

FIG. 1 shows a control unit 10 which includes at least one input circuit 12, at least one microcomputer 14 and at least one output circuit 16. These elements are connected to each other by a communication system 18 for mutual data exchange. Input lines lead to the input circuit 12 via which signals are supplied which represent operating quantities or from which operating quantities can be derived. In the preferred embodiment, the control unit 10 defines a control unit for controlling drive slip and, in other embodiments, the control unit 10 is an engine control unit or a combination of both.

For reasons of clarity, only input lines 20 to 24 are shown via which the control unit 10 is supplied with operating quantity signals from measuring devices 26 to 30. Operating quantity signals of this kind are, for example, signals which represent the driver command, engine rpm and/or output rpm signals or wheel speed signals, at least one quantity for determining an actual quantity of the control quantity of the drive unit, for example, of the torque or of the power as well as quantities from which, for example, the maximally transmittable output torque is computed in accordance with the state of the art mentioned initially herein. Depending upon the embodiment, the driver command quantity is the position of an operator-controlled element actuable by the driver from which an input value (for example, a desired torque) is derived for the control of the drive power or a quantity representing this input value.

The control unit 10 outputs actuating quantities via the output circuit 16 and the output lines connected thereto. These actuating quantities are outputted in the context of the control executed by the control unit 10. In the preferred embodiment, at least one output line 32 leads to at least one actuating element 34 for influencing the power or the torque of the drive unit of the vehicle. In the preferred embodiment, the actuating element 34 is an electrically actuable throttle flap of an internal combustion engine which his actuated via the line 32 by a corresponding actuating quantity. In other advantageous embodiments and supplementally, the brake system 38 of the vehicle is actuated and/or other operating variables of the engine (ignition angle, fuel metering, turbocharger) are controlled and/or interventions into an automatic transmission unit are undertaken via the at least one operating line 36.

In the preferred embodiment, a drive slip control system is realized in the context of the control unit 10. The control unit 10 continuously computes the driving resistance of the vehicle in accordance with the situation in the manner described in the state of the art mentioned initially herein. The sum of the drive resistances provides a maximum torque (output engine or engine torque) transmittable to the roadway. In the case of a tendency of slippage of at least one drive wheel, the engine torque is reduced such that this torque is adjusted to the maximum torque which can be applied to the roadway. The engine torque is essentially pregiven by the driver in dependence upon the torque wanted by the driver. Stated otherwise, the drive slip controller outputs an input value for the engine torque or output torque, which assumes a maximum value outside of the drive slip control. When the drive slip control becomes active, the pregiven input value is reduced to the torque M_AB maximally transferrable to the roadway. Then, the input value is changed in dependence upon slip and, when the tendency to slip vanishes, the input torque value is again increased by means of an incrementing function. In the context of the control of the drive unit, this input value of the drive slip controller is compared to the input value pregiven by the driver and the lesser of the two values is applied to control the drive unit.

The driver input value (driver command torque) is compared to a threshold value derived from the maximum transferrable torque in order to counter an occurrence of wheel slip during acceleration which occurs too often and to counter a wheel slip which is continuously too great or too long and to thereby counter a loss of acceleration and stability. If the driver input value exceeds this threshold value, then a time-dependent or speed-dependent limiting of the torque increase is carried out. This takes place in that the input value of the drive slip controller is set to a start value (here, M_AB). This input value is set to a maximum value outside of a drive slip controller intervention and outside of a limiting intervention. In the preferred embodiment, the start value is the minimum value of maximum transferrable torque value and the last desired value input of the drive slip controller during a drive slip control intervention. Starting from this start value, the input value is increased by specific amounts at specific time intervals or in dependence upon speed until a maximum is reached (for example, the driver input value) or a drive slip control intervention becomes active. With this limiting, the frequency of the occurrence of drive wheel slip is reduced and its magnitude and/or time duration is reduced and therefore the acceleration of the vehicle and stability of the vehicle are improved.

In an advantageous embodiment, the limiting is influenced in dependence upon wheel slip, the coefficient of friction and/or the vehicle acceleration. The increase of the limiting at high slip, low coefficient of friction or high acceleration is less than for small slip values, high friction values or low acceleration values.

Limiting of the increase is always permitted when the driver input again drops below the threshold value triggering the limiting intervention.

The limiting is likewise inhibited when the drive slip control system is switched to passive by a corresponding switch actuated by the driver.

Figure 2:
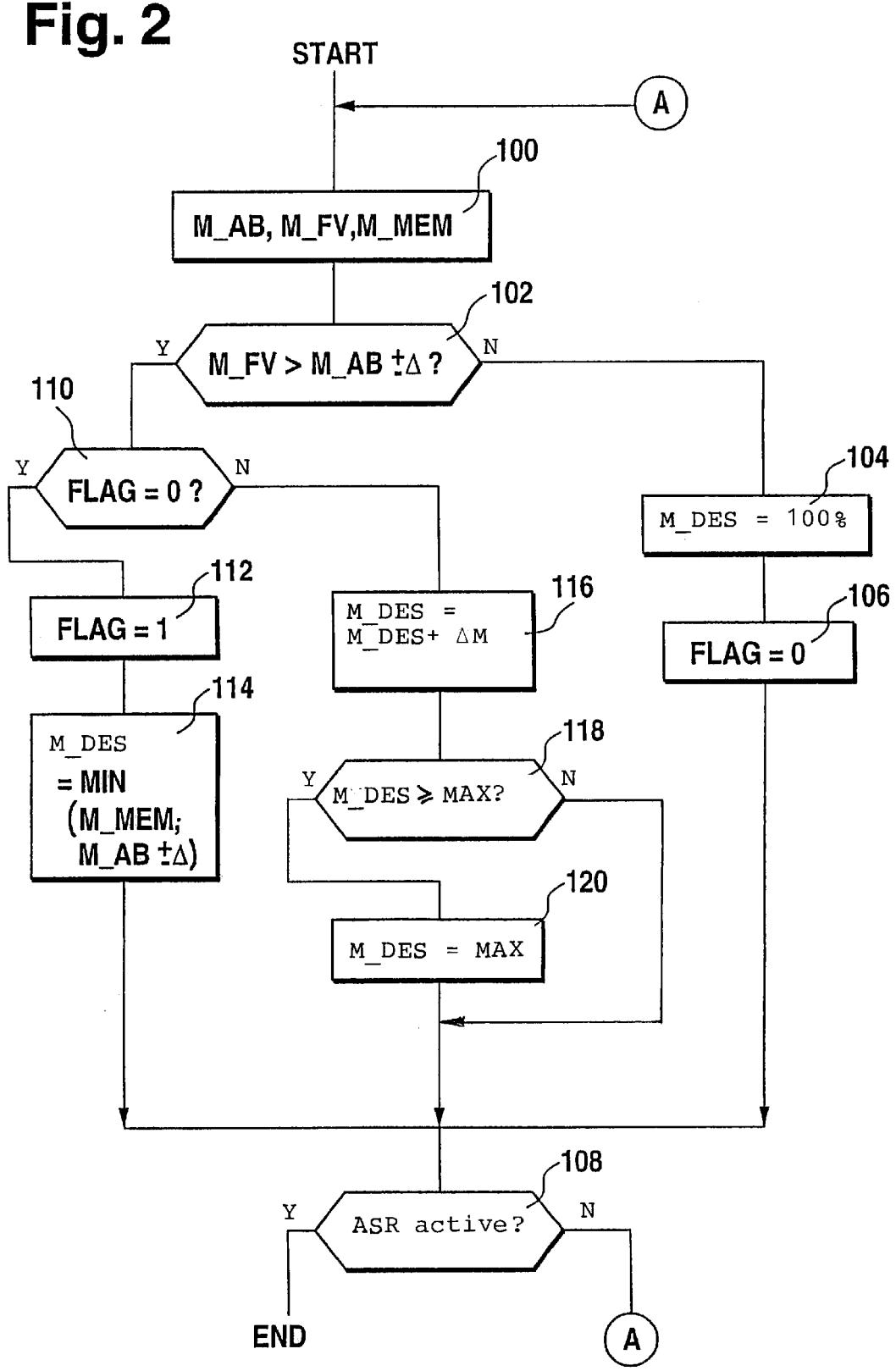
FIG. 2 is a flow diagram showing a preferred embodiment for limiting the increase of the control quantity and is realized as a computer program.

In FIG. 2, a flow diagram is shown, which presents a preferred realization of the procedure described above as a computer program. The program is run through at predetermined time intervals for an active drive slip controller. The program is not run through during an actually executed drive slip control intervention. In this case, the drive slip controller is active and it alone determines the desired value input for the control of the drive unit.

In the first step 100 of the program shown, the maximum transmittable torque M_AB, the driver command input torque M_FV and, in one embodiment, the stored torque M_MEM are read in. The maximum transmittable torque M_AB is computed, for example, with the method originally mentioned herein and the stored torque M_MEM defines the desired value input of the drive slip controller during the last drive slip control intervention, preferably, at the end thereof (in advance of initiating the added function). In the next step 102, a check is made as to whether the driver command torque M_FV is greater than a value M_AB±Δ derived from the maximally transmittable torque. If this is not the case, then, in step 104, the desired torque M_DES is set to its maximum value (100%) and, in the next step 106, a mark FLAG is set to 0. Thereafter, a check is made in step 108 as to whether a drive slip control intervention is active in order to reduce a recognized tendency to slip of at least one drive wheel. If this is the case, then the program is ended and is again run through only when the drive slip control intervention is ended; whereas, in the case of a negative answer, the program is repeated with step 100.

If step 102 has yielded that the driver command torque is greater than the threshold value, a check is made in step 110 as to whether the mark has the value 0. If this is the case, then, in step 102, an increase beyond the threshold value is recognized for the first time. In this case, in step 112, the mark is set to the value 1 and, in step 114, as the start value for the limiting, the minimum value is formed from the value M_AB±Δ, which is derived from the maximum transferrable torque, and the stored value M_MEM. The desired value M_DES is formed from the minimum of these values and is then outputted to control the drive unit. In this case, in another embodiment wherein the stored torque value is not present, the start value of the limiting is set to the value derived from the maximum transferrable torque. Step 108 follows step 114.

If step 110 has yielded that the mark does not have the value 0 (that is, an increase beyond the threshold value by the driver command value has already been recognized at least once), the torque desired value M_DES is incremented in step 116. The magnitude of the increment value ΔM can, as mentioned above, be dependent upon slip, coefficient of friction, speed and/or vehicle acceleration. With this time-dependent sequence of the runthrough of the program and the magnitude of the increment value, a step-like incrementing function occurs for the desired torque which defines, in average, a pregiven increase of the desired torque value. Thereafter, in step 118, a check is made as to whether the desired torque value formed in step 116 is greater than a pregiven maximum value. In a preferred embodiment, this maximum value is the maximum value from step 104 or the actual driver command value M_FV when this driver command value is less than the absolute maximum value. If the answer in step 118 is negative, then the desired value, which is formed in step 116, is outputted for controlling the drive unit; whereas, in the case of an affirmative answer in step 120, the desired value is limited to the maximum value. After 120 and for a negative answer in step 118, step 108 follows.

Figure 3:
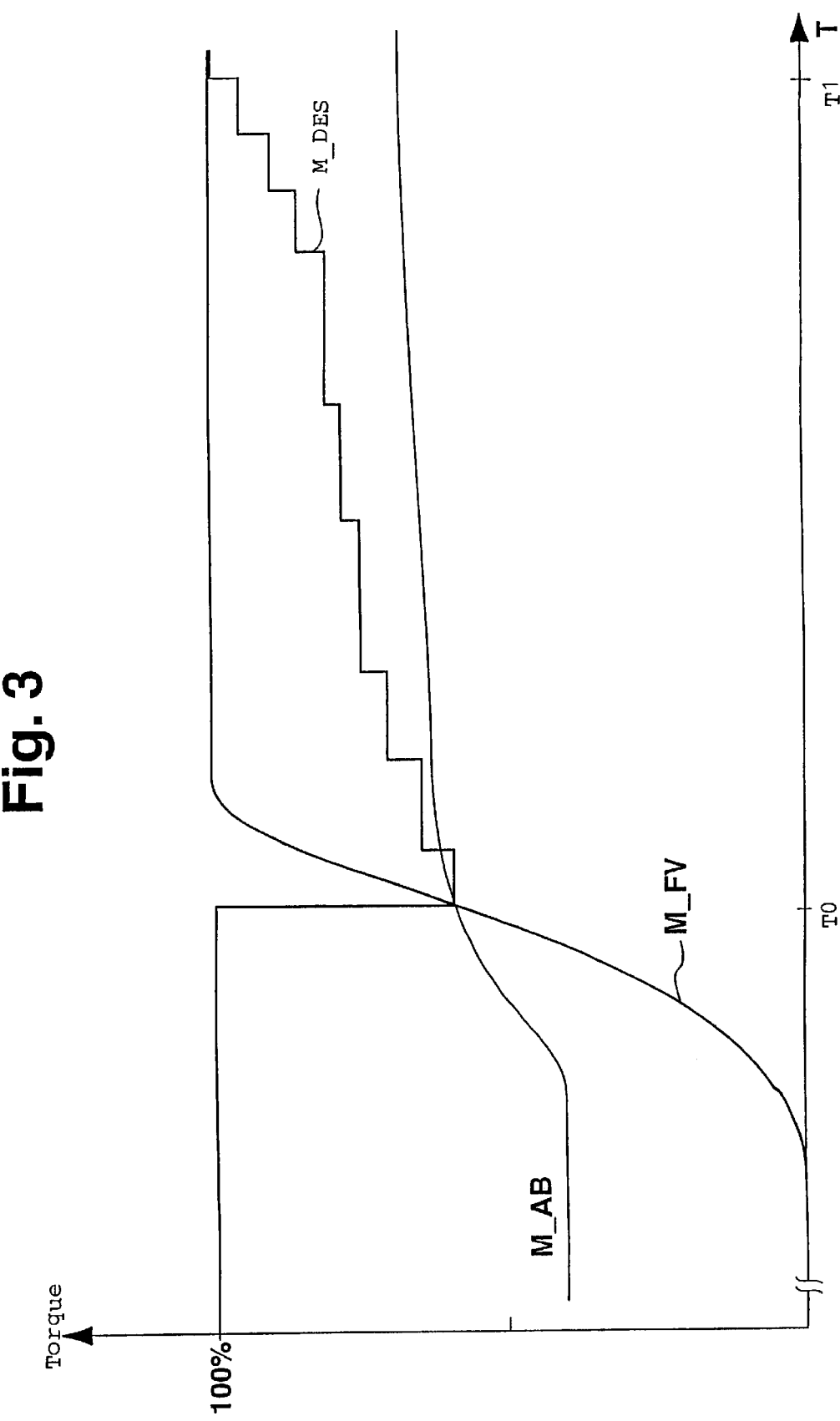
FIG. 3 is a graph showing the time-dependent traces of the driver command torque M_FV, the maximum outputtable torque M_AB and the desired torque M_DES for a first embodiment of the invention.

In FIG. 3, a time diagram is shown which represents the time-dependent trace of driver command torque M_FV, maximally transmittable torque M_AB as well as desired torque M_DES in a first embodiment. Up to time point T0, the driver command torque M_FV is less than the maximally transmittable torque. The drive unit is therefore essentially controlled by the driver command torque while the desired torque M_DES of the drive slip control assumes its maximum value (here 100%). At time point T0, the driver command torque exceeds the maximally transmittable torque. This leads to the situation that the maximally transmittable torque M_AB is outputted as the start value for the desired torque M_DES. Via a minimum value selection in the context of the drive control, the desired torque value M_DES is pregiven as the input value for the control of the drive unit in lieu of the driver command value. In the time interval between T0 and T1, the desired torque is increased in accordance with a pregiven time-dependent characteristic which cannot only be linear but can also be nonlinear. The increase of the desired torque value can be dependent upon operating quantities. At time point T1, the desired torque value reaches the maximum value so that the limiting of the increase of the desired torque M_DES is ended.

Figure 4:
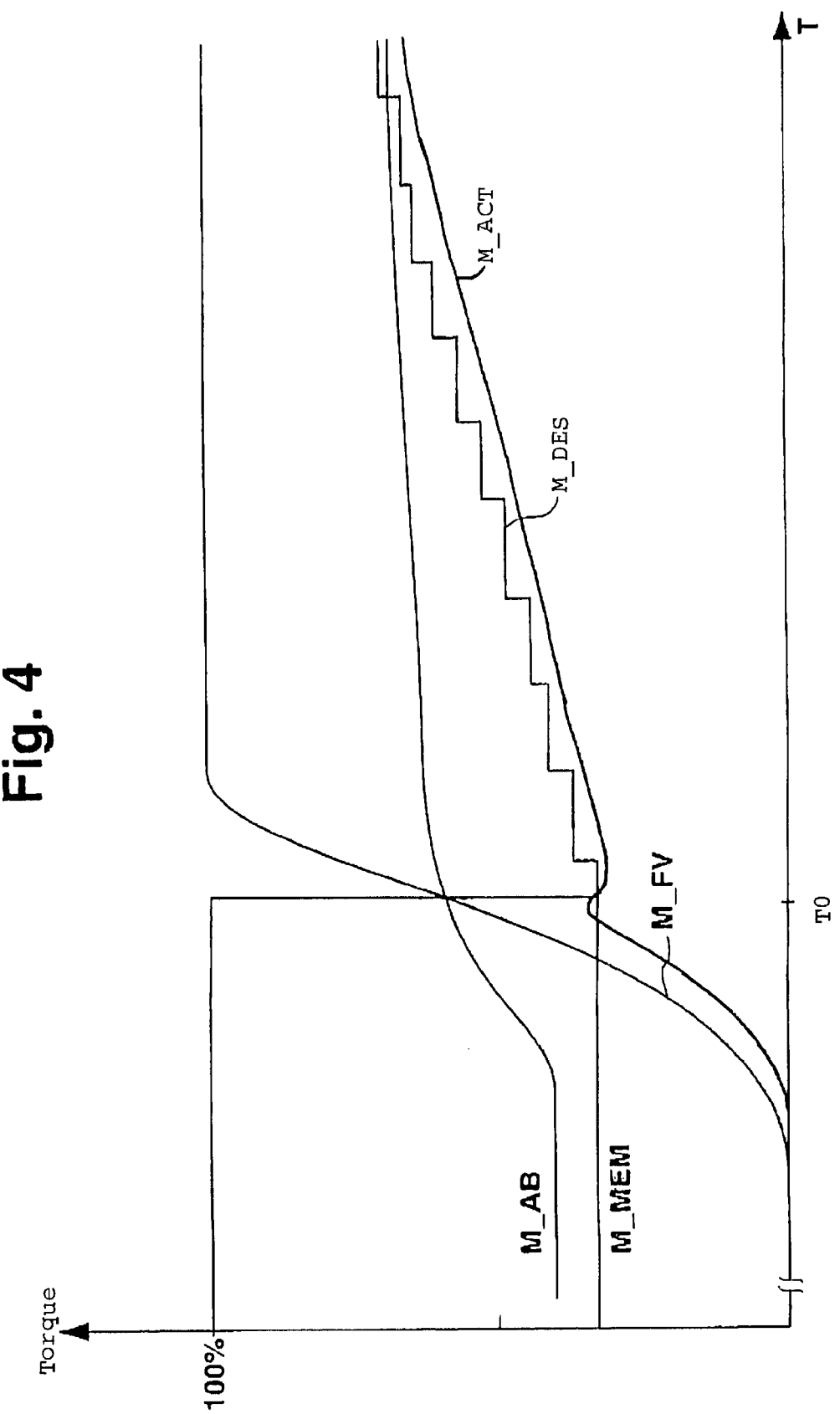
FIG. 4 is a graph showing the time-dependent traces of the corresponding signals in a second embodiment; and, FIG. 5 shows the time-dependent signal traces shown in FIG. 3 wherein the signal state of a mark is plotted which represents an active drive slip control intervention as a consequence of a tendency to slip of at least one drive wheel.

FIG. 4 shows the time-dependent traces of corresponding signals in a second embodiment. In this embodiment, a stored value M_MEM is considered from the last drive slip control intervention which value defines the last desired value input of the drive slip controller at the end of the last torque reducing drive slip control intervention. Up to time point T0, the operating situation corresponds to that outlined in FIG. 3. At time T0, the driver input value M_FV exceeds the torque M_AB. This leads to a back jump of the desired torque value from its maximum value to the stored value M_MEM because this is less than the maximum transferrable value M_AB. Starting from there, the above-described increased limiting of the torque change is started. Furthermore, the trace of the actual torque M_ACT is shown.

Figure 5:
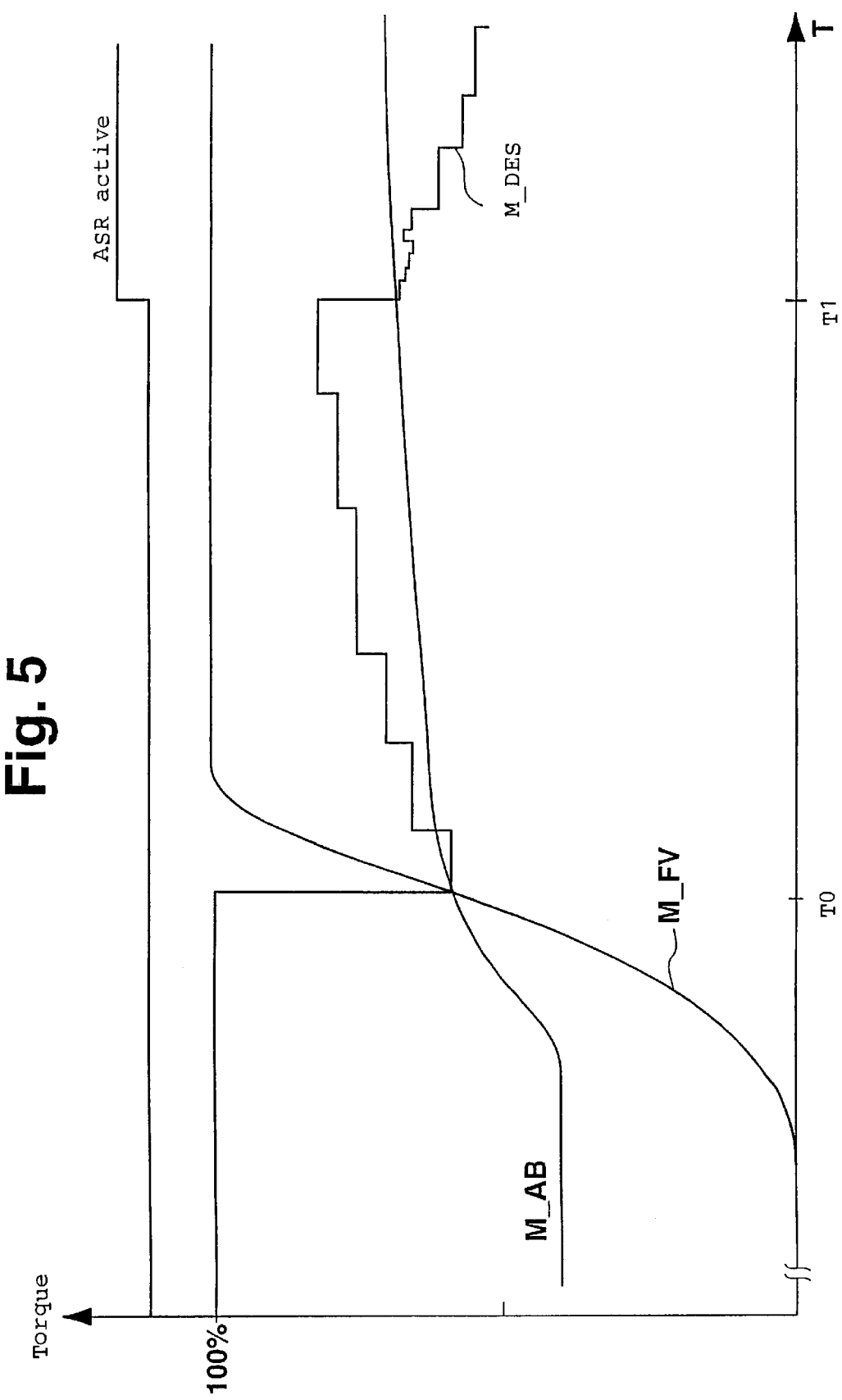

FIG. 5 shows the time-dependent signal traces shown in FIG. 3. The signal condition of a mark is entered here as a supplement and this signal condition represents an active drive slip control intervention as a consequence of the tendency to slip of at least one drive wheel (ASR active). Up to a time point T1, the operating situation shown in FIG. 5 corresponds to that shown in FIG. 3. Accordingly, limiting is undertaken when the maximum transferrable value is exceeded by the driver command value. At time point T1, the tendency to slip of at least one drive wheel is detected and the drive slip controller is switched to active. In this case, and as described with respect to the initially-mentioned state of the art, the desired torque M_DES is reduced to the maximally transmittable torque and is then reduced for further reduction of the tendency to slip until the tendency to slip is eliminated and is thereafter again increased (not shown) until, perhaps, a tendency to slip again occurs. The limiting is inhibited during the active phase of the drive slip controller.

The torque of the drive unit is controlled corresponding to the determined desired value M_DES at least as long as this desired value is less than the driver command value. In addition to the input of torque values, engine power values are pregiven in another embodiment. Engine torque values (combustion torque, clutch torque, et cetera) or output torque values or power values are summarized under the term "control quantities of the drive unit". Furthermore, as an input value, also the position of the throttle flap of an internal combustion engine or the fuel quantity to be metered thereto can be pregiven. These values fall under the term "control quantities".

The drive unit is an internal combustion engine or an electric motor depending upon the embodiment.

The term "torque", and depending upon the embodiment, is understood to mean the indicated torque of an internal combustion engine, the output torque of the motor, the output torque of the drive train (transmission output torque) or the wheel torque. These quantities are convertible one into the other in a manner known per se by means of additional operating quantities (consideration of losses of the engine and consumers, the transmission ratio, the differential ratio, et cetera).

It is understood that the foregoing description is that of the preferred embodiments of the invention and that various changes and modifications may be made thereto without departing from the spirit and scope of the invention as defined in the appended claims.

What is claimed is:

1. A method for controlling a motor for propelling a vehicle wherein an operator of the vehicle inputs a command value for a control quantity of said motor, the method comprising the steps of:

controlling said control quantity on the basis of said command value for said control quantity; and, limiting an increase of said control quantity when said command value for said control quantity is greater than a pregiven threshold value.

2. The method of claim 1, comprising the further steps of:

determining the maximally transmittable value for said control quantity; and, deriving said threshold value from said maximally transmittable value.

3. The method of claim 2, wherein said maximum value represents the torque maximally transmittable to a roadway.

4. The method of claim 1, comprising the further step of limiting the increase of said control quantity by providing a command value which forms the basis for the control of said control quantity of said motor in lieu of said command value of the operator.

5. The method of claim 1, comprising the further step of providing a drive slip controller having a last desired value input which is stored during a slip control intervention.

6. The method of claim 1, comprising the further step of controlling said control quantity of said motor to a start value when said threshold value is exceeded by said command value of the operator.

7. The method of claim 6, comprising the further step of forming said start value from said maximum value or from the minimum value of said maximally transmittable value and the stored value.

8. The method of claim 6, comprising the further step of increasing said control quantity of said motor in dependence upon time starting from said start value.

9. The method of claim 8, wherein said increase is also dependent upon an operating variable.

10. The method of claim 1, wherein said control quantity of said drive unit is a torque value.

11. The method of claim 1, wherein the limiting of said increase is again permitted when said input value of the operator again drops below said threshold value.

12. An arrangement for controlling a motor propelling a vehicle, the arrangement comprising:

a control unit for determining an operator command value for controlling a control quantity of said motor in dependence upon signals representing operating variables;

means for forming a control signal for controlling said control quantity of said motor on the basis of said operator command value; and, means for limiting an increase of said control quantity of said motor when said operator command value exceeds a pregiven threshold value.

* * * * *